Sept. 29, 1959 R. DORR 2,906,813

COLOR TELEVISION RECEIVER

Filed June 7, 1954 2 Sheets-Sheet 1

INVENTOR.
ROGER DORR

BY

Pennie, Edmonds, Morton, Barrows & Taylor

ATTORNEYS

Sept. 29, 1959 R. DORR 2,906,813

COLOR TELEVISION RECEIVER

Filed June 7, 1954 2 Sheets-Sheet 2

*INVENTOR.*
ROGER DORR

*BY*
Pennie, Edmonds, Morton, Barrows & Taylor
ATTORNEYS 2,906,813

COLOR TELEVISION RECEIVER

Roger Dorr, Danville, Calif., assignor, by mesne assignments, to Paramount Pictures Corporation, New York, N.Y., a corporation of New York Application June 7, 1954, Serial No. 434,709

10 Claims. (Cl. 178—5.4)

This invention relates to the reception and display of color television signals of the color sub-carrier type in which hue is conveyed as a phase modulation of the sub-carrier. The invention relates more particularly to the reception of such signals in apparatus including single gun cathode-ray picture or display tubes in which the information pertaining to the several (usually red, blue and green) primary colors of the additive system being employed must be supplied successively to the beam intensity controlling electrode or electrodes of the picture tube in synchronism with the operation of the deflection means which directs the electron beam of the single gun successively to areas of the tube face bearing phosphors luminescent in those colors. The invention provides a receiver for the reception of such signals and a display tube suitable thereto.

It has been heretofore proposed to display color television signals of this type on single gun picture tubes by decoding the received signal to three simultaneous red, blue and green signals and by sampling these in a sequence selected to fit the color switching sequence of the tube, which is determined by the arrangement of the red, blue and green phosphors therein and the order in which the beam can be switched to them. According to the present invention instead, the cathode-ray tube is constructed itself to sample the received signal, for excitation of its red, blue and green phosphor areas, in the sequence and at the phases in which information pertaining to these colors is present in the color sub-carrier cycle. For this purpose, in the tube of the invention the differently colored phosphors are disposed on the target area of the tube in a manner so related to the scanning undergone by the beam therein that the beam passes at color sub-carrier frequency over areas fluorescent in each of the primary colors of the system being employed, encountering the differently colored phosphor areas at the phases of sub-carrier cycle allocated to those colors respectively. In a preferred form of tube according to the invention the single electron beam is scanned—in addition to the usual line and field scannings—in a cycle of color sub-carrier frequency which brings it o bear successively within the color sub-carrier cycle upon areas luminescent in the three primary colors. Areas luminescent in the three colors are laid down over the face or target of the tube in a repetitive pattern so that each elemental area of the raster traced on the target by the line and field scannings contains a sub-elemental area fluorescent in each of the primary colors of the system employed. Within each elemental area the three sub-elemental phosphor areas as disposed in a manner related to the phase interrelation of color information in the received signal so that by proper phasing of the color scan with respect to the color synchronizing signal received, an automatic decoding takes place. The term color scan is here used to refer, not to the line and field scan by means of which the received picture may be correctly reconstituted as regards its black and white content, but to the supplementary scan by means of which the beam, when directed by the line and field scan to a given image element of the raster, is further deflected to the successive differently "colored" sub-elements of that image element.

In a preferred form of picture tube according to the invention for the reception of NTSC signals this micro-scanning or microdeflection is effected by means of a crossed grid structure adjacent the fluorescent screen, of the type disclosed in the patent to Ernest O. Lawrence No. 2,669,675 which is assigned to the assignee hereof, and within the area of the target or screen defined by each mesh of the crossed grids, three phosphor areas are provided, of generally sectoral shape, fluorescent in red, blue and green, the sectors being oriented or phased with respect to each other about the electron optical center of the mesh at the same angles as the relative phase angles of the red, blue and green color difference voltages of the chrominance signal to be received. The NTSC signals are those approved December 17, 1953 by the Federal Communications Commission on the petition of the National Television System Committee.

Further in accordance with the invention the chrominance information present in the received signal, representative at successive sub-carrier cycle phases (and with different constants of proportionality introduced in the interests of compatibility) of red, blue and green color difference voltages, is processed to compensate for the differences between those constants of proportionality. By means of this processing color difference signals are produced which can be added directly to the luminance component of the received signal to reproduce the complete color voltages. This addition may advantageously be performed on the beam intensity controlling electrodes of the cathode-ray tube. The color voltages so obtained excite phosphor areas of the correct colors in view of the arrangement of the phosphor areas and the color switching sequence of the tube to match the color sequence in the received signal.

Processing of the received chrominance signal according to the invention prior to its application to the picture tube is performed by passing it through a modulator or amplifier in the chrominance channel of the receiver whose instantaneous gain is varied over the sub-carrier cycle inversely with the constants of proportionality which characterize the color difference voltages as received.

For the sake of concreteness the invention will be described in terms of its application to reception of the so-called NTSC signal approved by the Federal Communications Commission December 18, 1953. It will consequently be described in terms of red, blue and green system of primary colors although of course it is not limited thereto nor to the particular color sub-carrier television signal of the NTSC standards.

The invention will now be described in greater detail in connection with the accompanying drawings in which.

Figure 1:
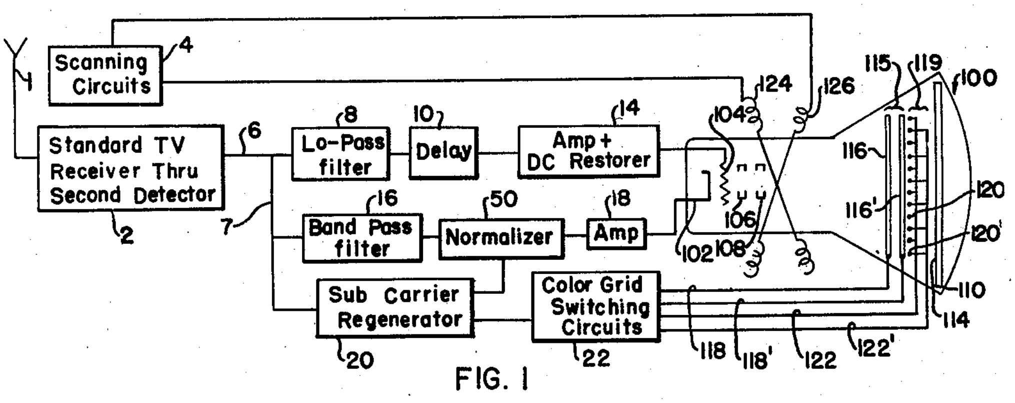
Fig. 1 is a diagram of a color television receiver according to the invention, partly in block form but schematic in its showing of the cathode-ray picture display tube.

Referring to Fig. 1, a television receiver according to the invention may include within the box 2 elements corresponding to the standard monochrome television receiver for all functions between the acceptance of the modulated radio frequency carrier on an antenna 1 and the delivery of a video signal at an output channel 6. This video signal includes a luminance component made up of a wide range of video frequencies extending for example from 0 to 4 megacycles and representative of brightness variations in the image to be reproduced. It also includes a chrominance component in the form of a color sub-carrier with side bands. The box 2 consequently includes R.F. and I.F. stages and a second detector, and it may include a video amplifier. It may also contain the power supplies necessary for the operation of those components and for development of the several accelerating voltages required by the cathode-ray tube, as hereinafter described. The usual scanning generators for the development of line and field deflection voltages are shown diagrammatically at a box 4. No reference to the sound components of the receiver will be made since these may be in all respects similar to those of monochrome receivers.

For application of the luminance component to the cathode-ray tube 100, the video signal in channel 6 is passed through a low pass filter 8, then through a delay unit 10 for suitable retardation, then to an amplifier 14, and then to the control grid 104 of cathode-ray tube 100. The filter 8 functions to protect the tube 100 from noise components above the highest transmitted video frequencies in the received signal. The amplifier 14 is provided for matching the gain of the luminance channel with that of the chrominance channel presently to be described, and includes means for D.C. restoration, operating on the line sync pulses of the luminance component.

A chrominance channel 7 branches off from channel 6 and leads to a band pass filter 16 which selects the chrominance components from the video information in channel 6. In the NTSC signal the chrominance components, in the form of phase and amplitude modulations on a 3.58 megacycle sub-carrier, lie within a range of approximately 2.2 to 4.2 megacycles. The filter may however be designed to pass a lesser range of frequencies. The chrominance components selected by filter 16 are then passed to a modulator 50 whose output is applied to the cathode 102 of the cathode-ray tube 100 through an equalizing amplifier 18. The nature and function of the modulator will be presently described. The equalizing amplifier may be an amplifier of uniform gain for all chrominance components handled by it and is provided for matching of the luminance and chrominance channels.

For operation of the modulator and also for micro-deflection of the cathode-ray beam, signals of sub-carrier frequency and appropriate phase are required. These are developed from the received video signal by a sub-carrier regenerator 20 operating on the "burst" or color synchronizing component of the received synchronizing signal. A sub-carrier regenerator circuit of this general type is disclosed in the article entitled "Compatible Color TV Receiver" at pages 98–104 of Electronics for February 1953. The sub-carrier regenerator contains components by means of which the intermittently received burst signal is transformed into a stable C.W. oscillation of color sub-carrier frequency, and it may contain the components necessary for delivering this oscillation in the phases required by the modulator 50 and by a color grid switching signal generator 22. Alternately appropriate phase adjustment may be effected within the units 50 and 22, respectively.

The essential function of the switching unit 22 is to provide two signals of color subcarrier frequency phased 90° apart, of relative amplitudes as required by the deflection sensitivity of the beam at the axial positions of the crossed color deflection grids of the tube, and of proper phases with respect to the burst.

Figure 2:
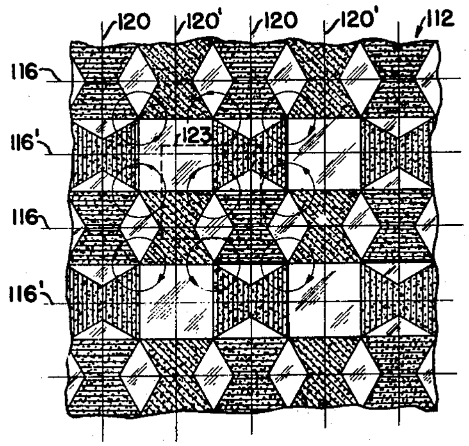
Fig. 2 is a fragmentary view in elevation of the micro-deflection or color selection grid structure and fluorescent screen of the picture tube of Fig. 1.

The cathode-ray tube 100 is of the post deflection focusing and grid switching type described in the co-pending application of Ernest O. Lawrence, Serial No. 219,213 assigned to the assignee hereof. As such, it includes in addition to the customary cathode 102, control grid 104, first anode 106 and second anode 108, a post deflection focusing and color switching grid structure located adjacent the fluorescent screen, which in one form of tube according to the invention illustrated in Fig. 1 is laid down on the side of a transparent target plate 110 nearest the electron gun. The fluorescent screen, generally indicated at 112 in Fig. 2, is overlaid with an electron permeable conducting layer indicated at 114 in Fig. 1, and an apertured grid structure is supported near the fluorescent screen in the path of the electron beam. A post deflection focusing voltage applied between the grid structure and the layer 114 focuses the electron beam, in its travel between the grid structure and the screen, to a cross section substantially smaller than that which it possesses upon reaching the grid structure.

In the tube of the present invention, as in the tube of the Lawrence Patent No. 2,669,675, the grid structure comprises a first grid 115 and a second grid 119. Grid 115 includes a set of generally parallel and coplanar wires or linear conductors 116 interlaced with another set of wires 116′ generally coplanar and parallel with the wires 116. The second grid 119 includes likewise a set of generally parallel and coplanar wires 120 interlaced with a set of wires 120′ generally coplanar and parallel with the wires 120. In each grid the separation of adjacent wires is of the order of magnitude of one elemental area of the picture to be reproduced. The wires 120 and 120′ are perpendicular to the wires 116 and 116′. In Fig. 1 the wires 120 and 120′ are shown perpendicular to the plane of the figure. The wires 116 and 116′, being parallel to the plane of the figure, cannot be separately shown in their coplanar relation, and are shown in a diagrammatic fashion only. All of the wires 116 are connected together and to a lead 118, and all of the wires 116′ are connected together and to a separate lead 118′. The two sets of wires 120 and 120′ of the second grid are similarly connected with leads 122 and 122′. The wires of each grid are supported within the tube by means of structure which holds the wires taut, with the necessary electrical insulation between the wires of the two grids, between the grid wires and other tube elements, and between adjacent wires within each grid. Supporting structure which may be used for this purpose is shown in the application of Renn Zaphiropoulos, Serial No. 307,435 which is assigned to the assignee hereof now Patent No. 2,638,833, issued July 13, 1954.

In operation of the tube 100 there is applied to the wires of the first grid 115 a D.C. potential approximately the same as that applied to the second anode 108. A high accelerating voltage which may be of the order of eight times that between cathode and second anode is then applied for post deflection focusing between the cathode and the conducting layer 114. To the wires of the second grid, there is applied a D.C. potential intermediate between that of the wires of the first grid and that of the layer 114. These accelerating and biasing potentials are applied to the cathode, control grid, first and second anodes and to the metal layer 114 by means of leads not shown which may originate in the receiver and power supply unit 2. D.C. potentials as above described may be applied to the grids 115 and 119 from the color grid switching voltage generator 22. In addition, sinusoidal color switching voltages are applied in quadrature between the wires 116 and 116′ of the first grid and between the wires 120 and 120′ of the second grid by means of the generator 22 through leads 118, 118' and 122, 122'.

For line and field scans, deflection coils 124 and 126 are fed with saw-tooth deflection currents from the scanning generator unit 4.

By way of example, one design for a tube having a raster area approximately 10" by 14" and a half deflection angle of 36° called for spacings of .030" between adjacent wires of each grid, .030" between the two grids, 0.42" between the second grid and screen, and for accelerating voltages of +2 kv. on the first grid, +2.56 kv. on the second grid and +18 kv. on the screen, all with respect to the cathode, and for color switching voltages of 320 volts peak to peak.

Figure 3:
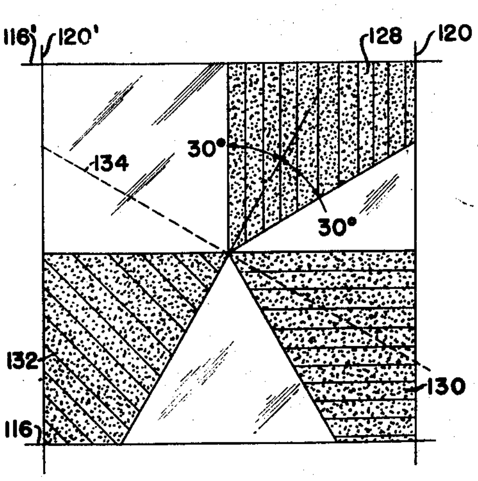
Fig. 3 is an enlarged view from Fig. 2 of one of the grid meshes and of its associated portion of the fluorescent screen.

The grids and the fluorescent screen of the tube of the invention are illustrated in Fig. 2, and at an enlarged scale in Fig. 3 for a single grid mesh such as the mesh enclosed within the dash line 123 in Fig. 2. The electron beam is focused by the gun to possess at the grids a cross section of the order of magnitude of the area of one grid mesh. The beam, or the fraction thereof entering one grid mesh, is further focused by the voltage between the grids and screen to a cross section much smaller than the area of a grid mesh and falling, in the absence of color switching voltages, on the electron optical center of the mesh area of the screen associated with that grid mesh. This mesh area, which may be impacted by electrons passing through the grid mesh, is defined approximately by the projections onto the screen of the two adjacent conductors 116 and 116' of the first grid and of the two adjacent conductors 120 and 120' of the other grid which define that grid mesh. The projections are taken along the trajectories which the beam electrons would follow in the absence of color switching voltages, in passing from the locations of the grid wires to the screen. The electron optical center of the mesh area is defined by a similar projection from the center of the grid mesh. In the center region of the screen the electrons move perpendicularly to the screen, and the projections are simple geometrical ones defined by perpendiculars to the screen surface, and Fig. 2 represents a small portion of the screen near the center thereof. Elsewhere on the screen, the component of velocity parallel to the screen which the electrons possess when they reach the grids together with their additional acceleration between grids and screen cause the projections to be displaced toward the edges of the screen, and the mesh areas and their electron optical centers are then determined for the tube of the invention in accordance with the principles disclosed in the copending applications of Ernest O. Lawrence Serial No. 380,309 and Serial No. 399,754 assigned to the assignee hereof. In accordance with the disclosures of those applications, the tubes of the present invention may also employ grids whose conductors are unevenly spaced and/or not parallel.

Upon the application of voltages in quadrature between the conductors 116 and 116' and between the conductors 120 and 120', the point of focus of the beam in each mesh area or cell will rotate about the electron optical center thereof, in opposite directions in any two laterally (as opposed to diagonally) adjacent cells as indicated by the arrows in Fig. 2.

According to the invention, within each cell of the screen the screen comprises three areas 128, 130 and 132 identified by the vertical, horizontal and diagonally inclined hatchings in the figure. Over each of these three areas the target plate 110 is covered with a material fluorescent on electron impact in one of the three primary colors of the signal system with which the receiver is to operate. For reception of the NTSC signal, in the mesh of Fig. 3 area 128 is fluorescent in red, area 130 is fluorescent in blue and area 132 is fluorescent in green. For an electron beam deflected in a circular path by the grid electrodes, these areas are essentially sectors of a circle centered at the electron optical center of the screen mesh. The sectors 128, 130 and 132 are positioned angularly with respect to each other about this center so that the bisectors thereof have successively substantially the angular separations of the red, blue and green color difference vectors in the NTSC signal illustrated in Fig. 10. From a comparison of Figs. 3 and 10 it will be apparent that the quadrature switching signals applied to the grids 115 and 119 should be together so phased as to bring the point of focus of the electron beam in its circular travel to the position of the radius vector 134, which is displaced 90° from the center bearing of the red sector 128, at the burst phase of the received color sub-carrier, due allowance being made for phase delay through the receiver to the intensity controlling electrodes of the tube and in the flight of the electrons down the length of the tube 100.

In the NTSC signal the burst phase leads by 90° the phase of the color sub-carrier cycle at which the chrominance component is proportional to the red color difference voltage. Consequently the color switching signals applied to the grids should be phased to rotate the point of focus in each cell successively to the red, blue and green phosphor areas in that order, e.g. clockwise in cells such as that of Fig. 3.

In the embodiment illustrated the angular widths of the sectors 128, 130 and 132 are equal and are shown as of 60°. Although it might seem necessary to limit the phosphor sectors to narrow angles in order to avoid hue contamination, in fact the average value of the chrominance signal over a sampling interval amounting to a substantial fraction of the sub-carrier cycle is very nearly equal to the instantaneous value at the mid-point of the sampling interval, i.e. at the center bearing of the sector, so that wide angle sampling can be used. This results in a much more efficient use of energy in the electron beam.

In virtue of the reversal of the sense of rotation of the beam in adjacent grid meshes, the arrangement of phosphors in any two laterally adjacent meshes of the screen is reversed, i.e. the two are mirror images of each other in the line defined by the grid wire which separates them. As a result, as will be apparent from Fig. 2, the corresponding phosphor sectors of adjacent cells or meshes of the screen may be consolidated into areas of hourglass or "bow tie" shape. Strictly speaking, the bow tie shape shown in Fig. 2 results from a slight misplacing of the green sector. In the NTSC signal the green color difference vector is 124.26° later in phase than the blue color difference vector. Ideally therefore the center bearing of the green sector should be 124.26° from the center bearing of the blue sector, whereas in Figs. 2 and 3 the phosphor areas have been laid down in such a fashion as to make this angle 120°. The amount of error in hue introduced by this approximation is small however. Actually, the sectors employed may be either wider or narrower than those shown in the drawings. They may moreover be made of unequal widths in order to compensate in part for differences in luminous efficiency among the different phosphors.

The target plate 110 (or the face of the tube, if no separate target plate is provided) may be left without fluorescent material in the sectors of the screen meshes between the sectors 128, 130 and 132, and this provides automatically the equivalent of a blanking signal to prevent the simultaneous excitation of two primary colors.

Figure 10:
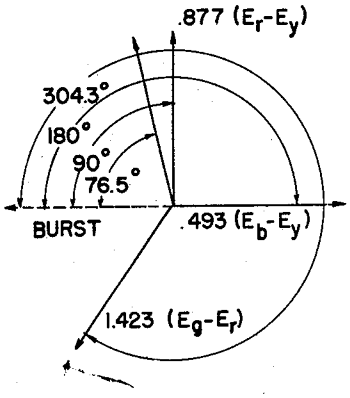
Fig. 10 is a vector diagram illustrating certain properties of the NTSC signal. Neither the diagram nor the NTSC signal of course, form part of the invention.

The nature and function of the modulator 50 will now be explained. In the NTSC signal the constants of proportionality for the three color difference voltages in the chrominance are not equal. As shown in Fig. 10 the constants of proportionality for the red color difference voltage $E_R-E_Y$ is 0.877 while those for the blue and green color difference voltages $E_B-E_Y$ and $E_G-E_Y$ are 0.493 and 1.423, respectively. Hence if the chrominance signal selected in the filter 16 were to be uniformly amplified and added to the luminance for the display of color voltages in the tube, false color values would result.

Figure 5:
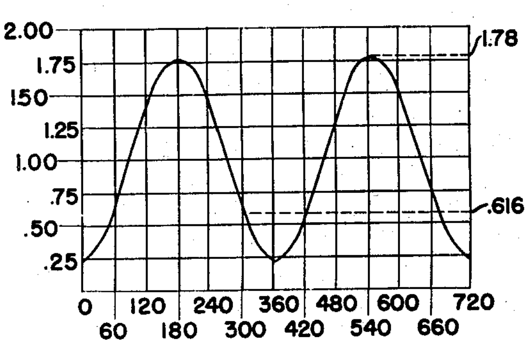
Fig. 5 is a graph illustrating the modulating signal or variation in gain over the sub-carrier cycle applied in the modulator of Fig. 4 to the chrominance signal.

Consequently sampling of the total color signal by means of the display tube of the invention must, for proper color rendition, be preceded by the restoration of the color difference voltages to their correct relative amplitudes, a process which may be referred to as normalizing. Such normalization comprises essentially passage of the chrominance component of the received signal through an amplifier whose gain is varied over the color sub-carrier cycle in a manner inversely proportional to the .877, .493 and 1.423 factors previously referred to at the phases of the color sub-carrier cycle at which the chrominance is successively proportional to the red, blue and green color difference signals to be recovered. The amplifier 50 is therefore a modulated amplifier or modulator. Fig. 5 is a plot of a gain suitable for the modulator 50 of the invention, relative gain being plotted vertically as a function of phase over a sub-carrier cycle. On this diagram the burst phase is taken as the origin or 0° point in the color sub-carrier cycle. The red color difference phase then appears at 90°, the blue color difference at 180°, and the green color difference at 304.26°. If, for simplicity of explanation, the amplifier is given for the moment unity gain at the red color difference phase, its gain at the blue color difference phase should be $$1/.493 \times 1/1.14$$

and similarly its gain at the green color difference phase should be $1/1.423 \times 1/1.14$, giving gains of 1.0, 1.78 and 0.616 at the red, blue and green color difference phases as indicated on the right-hand scale of ordinates in Fig. 5.

These gains lie nearly on a sinusoidal curve of color sub-carrier frequency and amplitude .78 having its A.C. axis at the unity gain level and phased to cross its A.C. axis in a positive-going direction 90° after the start of the sub-carrier cycle, assumed to be at the burst phase. The gains thus lie approximately on a gain curve according to the function $$1-.78 \cos \omega t$$

in which $\omega$ is the angular frequency of the color subcarrier and the angle $\omega t$ is measured from the burst phase. Such a sinusoidal gain curve is plotted in Fig. 5. At the green color difference phase the curve has an ordinate of $$1-.78 \cos 304.26^\circ = .564$$

instead of .616. The error introduced is small however, and fully acceptable color reproduction is possible with such a simple normalizing function. In a preferred embodiment of the receiver of the invention therefore, as used to display the NTSC signal by addition of luminance and color difference signals, there is employed a normalizing function or voltage which comprises the sum of a D.C. term and a sinusoidal term of color sub-carrier frequency 90° displaced from the burst phase, the ratio of the amplitude of the sinusoidal to the D.C. component being .78.

For simplicity of explanation the curve of Fig. 5 has been described in terms of a normalizing function having unity gain at the red color difference phase where the gain falls between the maximum gain desired at the blue phase and the minimum gain desired at the green phase. Actually, for the preservation of balance between the luminance and chrominance channels, the gain of the modulator should be at all phases greater by a factor of 1.14. The reciprocals of the coefficients .877, .493 and 1.423 are 1.14, 2.03 and .703, not 1, 1.78 and .616. The additional 1.14 gain factor can however be provided either in the modulator or in the balancing amplifier 18 where, in any event (unless made in the matching amplifier 14 of the luminance channel), adjustment must be made to compensate for unequal gains and losses in the two channels. Regardless of where applied, the additional gain of 1.14 will not change the shape of the normalizing function employed.

The chrominance signal to be handled by the modulator 50 is made up of a sub-carrier modulated in phase and amplitude, and may for a solid color field be written as $$A \cos (\omega t-\phi)$$

in which the phase angle $\phi$ represents hue and the amplitude A depends upon hue and saturation, being .632 for maximum saturated red for example and for which $\phi=76.5^\circ$. The signal to be developed in the modulator 50 is therefore of the form $$1.14A \cos (\omega t-\phi)(1-.78 \cos \omega t)$$

This contains for a flat field a D.C. term, a component of sub-carrier frequency, and a term in the second harmonic of color sub-carrier frequency. With a field of varying hue, both A and $\phi$ vary at rates up to the highest rate of modulation on the color sub-carrier passed by the transmitter, i.e. approximately 1.3 megacycles, and these variations appear in the output of the modulator as modulations on the fundamental and second harmonic components of the color sub-carrier. To preserve color values faithfully therefore, the modulator 50 and the amplifier 18 which follows it should have a band width from D.C. to the upper side band of the second harmonic of the sub-carrier frequency, i.e. up to approximately 8.46 megacycles.

Figure 4:
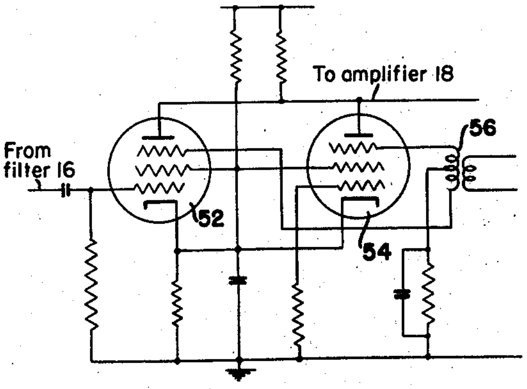
Fig. 4 is a schematic diagram of one form of modulator according to the invention suitable for use in the receiver of Fig. 1.

Fig. 4 illustrates schematically a circuit suitable for the modulator 50 of Fig. 1. Two pentodes 52 and 54 are connected in parallel and are operated in regions where their transconductance varies linearly with suppressor grid voltage. The chrominance signal, selected in filter 16, is applied to the control grid of tube 52. An alternating voltage of color sub-carrier frequency derived from the sub-carrier regenerator 20 is applied through a transformer 56 in opposite phases to the suppressor grids of the two tubes. The phase of the voltage applied to transformer 56 is adjusted so that the voltage applied by the transformer to the suppressor grid of tube 52 possesses the phase indicated by the curve of Fig. 5, i.e. it is delayed 90° with respect to the burst phase of the chrominance as applied to the control grid of that tube. Effectively therefore the gain of tube 52 changes over the color sub-carrier cycle in accordance with the control function plotted in Fig. 5. The second pentode 54, with the normalizing voltage from transformer 56 appearing in opposite phase on its suppressor grid, compensates for the varying component of plate current in tube 52 produced by the voltage on the suppressor grid of that tube. Consequently the chrominance signal as it appears on the plates of the two tubes in parallel is, within the small error introduced by the use of the normalizing voltage of Fig. 5, uniformly proportional at 90°, 180° and 304° of the color sub-carrier cycle to the red, blue and green color difference voltages.

The operation of the normalizing circuit of Fig. 4 is further illustrated in Figs. 6–9 which are graphs representing respectively the modified chrominance signal developed in the modulator of the invention, with the normalizing signal of Fig. 5, for maximum saturated red, green, blue and yellow flat fields. The diagrams show this product function for one color sub-carrier cycle, zero degrees on the degree scale of abscissas corresponding to the burst phase. For clarity a cycle of the burst reference has been drawn in dotted lines onto Fig. 6, where it is seen to be of maximum positive amplitude at zero degrees of the scale of abscissa. The scale of ordinates in Figs. 6–9 has been selected to make unity equal to the cut-off voltage in the picture tube.

In the NTSC signal the gamma corrected luminance component $E_Y$ is made up of weighted components of the green, red and blue color voltages approximately in the proportions:

$$E_Y=.59E_G+.3E_R+.11E_B$$

In a flat saturated red field of maximum brightness, the red voltage is of maximum value, and may be set equal to unity, whereas the blue and green voltages are zero. Hence with such a field the luminance signal is given by $$E_Y = .3$$

and the three color differences are:

$$E_R - E_Y = .7 \text{ (at } 90°)$$

$$E_B - E_Y = -.3 \text{ (at } 180°)$$

and $$E_G - E_Y = -.3 \text{ (at } 304°)$$

Figure 6:
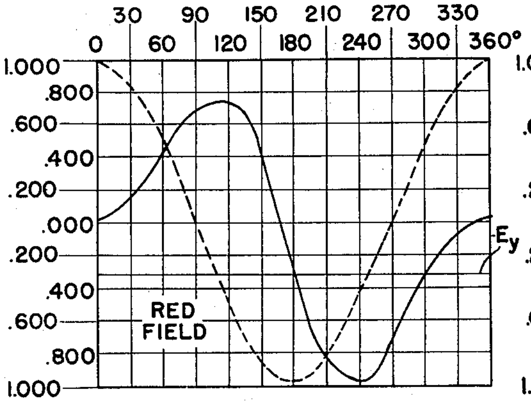
Figs. 6–9 are additional graphs useful in understanding the operation of the modulator of Fig. 4.

Fig. 6 shows that for a flat saturated red field the output of the normalizing amplifier corresponds to these values of color difference voltage, since it passes through the ordinate 0.7 at 90° and through the ordinate —.3 at 180° and again at 304°. The negative of the luminance voltage $E_Y$ has been plotted on Fig. 6 at —.3 to illustrate the total grid-to-cathode voltage $(E_R - E_Y) + E_Y$ which is applied to the tube from the luminance and chrominance channels together, in opposition to a fixed bias of cut-off value, this total voltage being measured in Fig. 6 between the $-E_Y$ level and the product function curve. Whenever the normalized chrominance curve lies above the —Y curve, a signal is applied to the tube lifting the grid effectively above cut-off, and permitting some beam current to flow. The sampling phases for 60° phosphor sectors disposed as in Figs. 2 and 3 are red: 60–120°, blue: 150–210°, and green: 270–330°.

Figure 7:
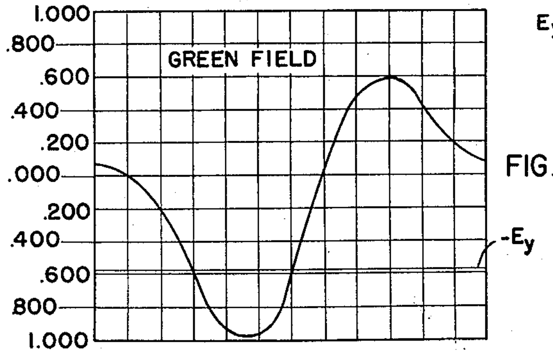
Figure 8:
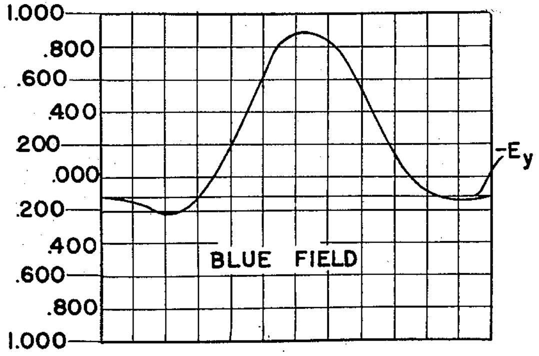
Figure 9:
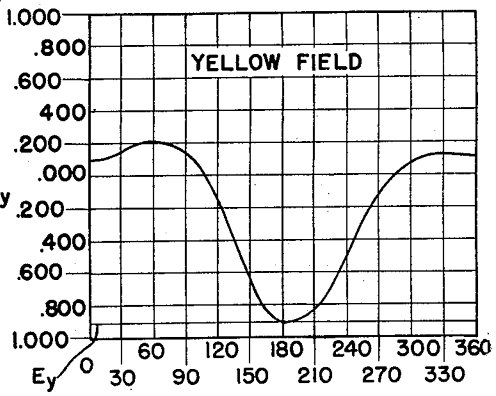

Figs. 7, 8 and 9 are similar plots for flat, saturated fields of green, blue and yellow. For green the corresponding color, luminance, and color difference values are:

$$E_R = 0, E_G = 1, E_B = 0$$

$$E_Y = .59$$

$$E_R - E_Y = -.59$$

$$E_G - E_Y = .41$$

$$E_B - E_Y = -.59$$

Correspondingly the curve of normalized color differences in Fig. 7 passes through the ordinate —.59 at the $E_R - E_Y$ and the $E_B - E_Y$ phases and through the ordinate .41 at the $E_G - E_Y$ phase.

For the blue field, the color, luminance and color difference values are $$E_R = 0, E_G = 0, E_B = 1$$

$$E_Y = .11$$

$$E_R - E_Y = -.11$$

$$E_B - E_Y = .89$$

$$E_G - E_Y = -.11$$

Hence the color difference curve of Fig. 8 passes through the ordinate —.11 at the red and green color difference phases and through the ordinate .89 at the blue color difference phase.

For the flat yellow field of Fig. 9, red and green are both present at full saturation in the field being scanned. Consequently the color, luminance and color difference values are $$E_R = 1, E_G = 1, E_B = 0$$

$$E_Y = .89$$

$$E_R - E_Y = .11$$

$$E_G - E_Y = .11$$

$$E_B - E_Y = -.89$$

and the color difference curve of Fig. 9 is in accordance with these values.

When the voltage between the negative luminance value and the normalized chrominance value exceeds unity on the cut-off scale of Figs. 6–9, means may be provided for preventing the control grid of the cathode-ray tube from being driven positive.

It will be seen in Figs. 6—9 that the cathode-ray beam is not wholly cut off during all sampling intervals except those of the primary colors contributing to the color intended to be reproduced. Thus in Fig. 6 the normalized chrominance curve for a flat red field indicates a small amount of blue excitation between 150° and 180°, and a smaller amount of green excitation between 300° and 330°. The amount of color contamination resulting is however very small in any case, particularly in view of the non-linear transfer characteristics of the electron gun of the tube. Computations indicate that, with balanced phosphors, the contamination is no more than about 4 percent of blue in reproducing a red field, about 1.5 percent of red in reproducing a blue field, about 3 percent of blue and 2 percent of red in reproducing a green field and in reproducing a yellow field the blue contamination amounts to 1 percent of the combined red and green which are desired. In the red and blue fields the green contamination is negligible. If the sectoral phosphor sub-areas are made of unequal width to compensate for unbalance in the phosphors, the contamination will be further decreased.

In the description which has been given above of the normalizing of the chrominance, to permit the extraction by sampling in the cathode-ray tube of voltages uniformly proportional to color difference voltages, a simple normalizing function has been discussed. In this function the sinusoidal component has a simple phase relation (0°) to one of the color difference phases to be dealt with (the red), and hence a 90° phase relation to the burst phase or a 180° phase relation to the color subcarrier when in the burst phase, i.e. when having its maximum at the burst phase. Hence the gain applied at the red color difference phase is due to the D.C. component only. Moreover the function is characterized by a simple ratio of the D.C. to the sinusoidal components suggested by the possibility of applying maximum gain at the blue color difference phase.

This function produces imperfect normalization as has been pointed out, and while the results so obtained are quite satisfactory, it is also within the scope of the invention to provide improved normalizing functions accurately fitted to the desired gains and phases therefor. Such accurately fitted functions also preferably take the form of a D.C. component plus a sinusoidal component of color subcarrier frequency, but the ratio of amplitudes between the sinusoidal and D.C. components need have no relation to any of the gains to be achieved, nor need the sine wave pass through its A.C. axis at any one of those gains.

The problem is that of finding the normalizing function, in the form of a D.C. term plus a sinusoidal term of color sub-carrier frequency and proper phase, which will pass through three amplitudes desired for the gain of the modulator at the specified phases of the color subcarrier cycle—i.e. the phases of the color difference vectors of the NTSC signal, in the example of the invention which has been described. If these amplitudes, which are reciprocals of the constants of proportionality applicable at the color difference phases, or numbers proportional to those reciprocals, are $P_1$, $P_2$ and $P_3$, one may write:

$$P_1 = A + B \sin \phi \quad (1)$$

$$P_2 = A + B \sin (\phi_0 + \phi_1) \quad (2)$$

$$P_3 = A + B \sin (\phi_0 + \phi_2) \quad (3)$$

in which A is the amplitude of the D.C. component, B is the amplitude of the sinusoidal component, $\phi_0$ is the phase of the sine wave at the phase of $P_1$, $\phi_1$ is the phase difference between $P_1$ and $P_2$, and $\phi_2$ is the phase difference between $P_1$ and $P_3$.

These equations may be solved for $\phi_0$, A and B as follows:

$$\phi_0=\cot^{-1}\left\{\frac{(P_1-P_3)(1-\cos\phi_1)-(P_1-P_2)(1-\cos\phi_2)}{(P_1-P_3)\sin\phi_1-(P_1-P_2)\sin\phi_2}\right. \quad (4)$$

$$B=\frac{(P_1-P_2)}{\sin\phi_0-\sin(\phi_0+\phi_1)} \quad (5)$$

$$A=P_1-B\sin\phi_0 \quad (6)$$

It is seen that the suitability of a normalizing function comprising a D.C. component and a sine component of proper phase and of amplitude properly proportioned to the D.C. component is not in any way conditioned by the values of the constants of proportionality to be corrected or normalized. On the contrary, the invention in this aspect is applicable to the normalization of any three quantities cyclically recurring in the same relative phases.

If these results are applied to the selection of a normalizing function for the color difference voltages of the NTSC signal, one may start from desired gains of $P_1=1$, $P_2=1.78$ and $P_3=.616$ at the red, blue and green color difference phases, and from knowledge that $\phi_1=90°$ (separation of red and blue color difference phases) and that $\phi_2=214.26°$ (phase difference between the red and green color difference phases). Equations 4, 5 and 6 then give:

$$\phi_0=-1°\ 48.5'$$
$$B=.7565$$
and
$$A=1.0239$$

Perfect normalization will then be achieved if the ratio of the sinusoidal to D.C. components is .7565/1.0239 and if the sine component is phased to cross its A.C. axis 1° 48.5′ ahead of the red color difference phase.

The same normalizing function, except for a constant factor of 1.14 applicable to both D.C. and sine components, is of course obtained if the chrominance is to be normalized to unity instead of to .877, i.e. if the gains desired in the modulator are to be made equal to the reciprocals of the proportionality constants .877, .493 and 1.423 instead of being made proportional to those reciprocals by a factor of 1/1.14. In such case $P_1=1.14$, $P_2=2.03$, $P_3=.703$, $\phi_1=90°$ and $\phi_2=214.26°$. Equations 4, 5 and 6 then give:

$$\phi_0=-1°\ 48.5'$$
$$B=.863$$
and
$$A=1.17$$

Substitution of these values for A, B and $\phi_0$ into Equations 1, 2 and 3 shows that the desired gains of 1.14, 2.03 and .703 will indeed be obtained.

While the invention has been described in terms of one preferred form of receiver and its components, the invention is not restricted thereto. For example, other forms of apparatus than that shown in Fig. 4 may be used for modulation of the receiver chrominance in order to perform the normalizing operation which has been described herein. Cathode-ray tubes according to the invention may differ in various respects from the showing of the drawings, as has already been stated. Moreover, while the invention has been described in terms of its application to the reception of NTSC signals, the invention is not restricted to such utility. Tubes according to the invention may be constructed for the automatic decoding and display of any color television signals in which the phase of some modulation component of the received signal varies with the hue of the subject matter transmitted, and normalization according to the invention may be applied to the extraction of voltages uniformly proportional to desired quantities in very different contexts. Even as applied to the extraction of color difference voltages from the NTSC and similar signals, the method and apparatus for normalization according to the invention are not restricted in utility to apparatus employing cathode-ray tubes of the self-decoding type disclosed herein.

I claim:

1. A color television receiver for the reception of color television signals according to an additive system employing a plurality of primary colors, said signals including a luminance component and a modulated subcarrier chrominance component resolvable at selected phases of the color sub-carrier cycle into primary color difference voltages having different amplitude coefficients, said receiver comprising a luminance amplification channel, a chrominance amplification channel, means in said chrominance channel to equalize said coefficients, a cathode-ray tube to which the outputs of said luminance channel and said equalized chrominance channel are applied in additive relation, said tube including a fluorescent screen divided into a multiplicity of areas of elemental size in each of which the cathode-ray beam of said tube is deflectable along a closed path in a cycle of color subcarrier frequency to areas of sub-elemental size fluorescent in the primary colors of said signals, the sub-elemental fluorescent areas in each of said elemental areas having positions spaced from each other on centers along said path by the said selected phases, means to deflect said beam over said screen in a pattern of lines and frames, and means to supplementarily deflect said beam cyclically at color sub-carrier frequency to direct said beam, during said deflection in lines and frames, at said selected phases to those of said sub-elemental areas which are fluorescent in the primary colors into whose color difference voltages said chrominance component is resolvable at said selected phases respectively.

2. Apparatus for the reception and display of NTSC color television signals comprising a luminance amplification channel; a chrominance amplification channel; two multigrid amplifier tubes connected in parallel in said chrominance channel; means to apply the chrominance signal to one grid of one of said tubes and means to apply a voltage having a fundamental component of color sub-carrier frequency to another grid of said one tube with a phase substantially 90° behind that of the color burst in the chrominance signal as applied to said one grid and in opposite phase to the corresponding grid of the other of said tubes; a cathode-ray tube coupled to the outputs of said channels, said cathode-ray tube including an electron gun, a transparent target, a conducting electron-permeable layer supported adjacent said target, said gun being adapted to develop an electron beam bidimensionally deflectable across said target to trace a raster thereon, crossed color deflection grids disposed between said gun and target, each of said grids including two sets of interlaced linear conductors electrically insulated from each other, the conductors of said grids defining a multiplicity of grid meshes having dimensions of the order of magnitude of an elemental area of the pictures to be displayed in said cathode-ray tube, each of said grid meshes defining, for given accelerating voltages between said gun and grids and between said grids and conducting layer, an associated quadrilateral mesh area on said target, and a plurality of areas of phosphors of sectoral shape disposed on said target in each of said mesh areas, said phosphor areas being fluorescent one in each of the primary colors of said signals, the phosphor areas in each of said mesh areas being disposed about the electron optical center of such mesh area with the bisectors of said phosphor areas from said center spaced at successive angular intervals substantially equal to the angular separations of the phases of the color sub-carrier cycle of said signals at which the chrominance component of said signals is proportional to the primary color difference voltages of said signals; means to derive from said signals two voltages of color sub-carrier frequency in substantially quadrature relation; and means to apply said quadrature voltages one between the interlaced sets of conductors of each of said grids.

3. A cathode-ray tube for the display of color television signals according to a system of additive primary colors and in which signals hue is transmitted as a phase modulation of a cyclically varying component of the transmitted signal, said tube comprising an electron gun, a fluorescent screen, a crossed deflection grid structure supported between said screen and gun, said structure dividing said screen into a multiplicity of meshes, and a plurality of phospher areas in each of said meshes, said plurality including an area fluorescent in each of said primary colors, the areas of said plurality being substantially centered about the electron optical center of each such mesh with the bisectors of said areas from said center spaced at successive angular intervals substantially equal to the angular separations of the phases of said component allocated to said primary colors respectively.

4. A cathode-ray tube for the display of received color television signals of the color sub-carrier type in which the phase of the color sub-carrier changes with the hue of the color to be reproduced, said tube comprising a transparent target, an electron gun adapted to generate an electron beam deflectable in lines and fields to trace a bidimensional raster on said target, crossed color deflection grids disposed between said gun and target, each of said grids including two sets of interlaced linear conductors electrically insulated from each other, whereby upon the application of a first alternating voltage between the two sets of conductors of a first one of said grids and the application of a second alternating voltage of the same frequency but substantially 90° phase displaced from said first alternating voltage between the sets of conductors of the other of said grids, said beam will suffer between said grids and screen a supplementary deflection in substantially circular paths on said target within each of a multiplicity of mesh areas each associated with one of a like multiplicity of grid meshes defined by pairs of adjacent conductors of said crossed grids, and a plurality of areas of phosphors fluorescent one in each of three primary colors of an additive color system disposed in each of said mesh areas, said phosphor areas being of sectoral shape and being bounded by radii from the electron optical centers of their mesh areas, adjacent of said phosphor areas being separated by sectoral areas substantially devoid of phosphors, said phosphor areas being substantially centered about the electron optical centers of their mesh areas with the bisectors of said phosphor areas from said centers spaced at successive angular intervals substantially equal to the angular separations of the phases of the color sub-carrier cycle of said signals associated with said primary colors respectively.

5. A cathode-ray tube for the display of color television signals according to a system of additive primary colors and in which signals hue is transmitted as a phase modulation of a color sub-carrier frequency, said tube comprising an electron gun, a support for a fluorescent screen, a conducting electron-permeable layer supported adjacent said support in the path of electrons from said gun, crossed color deflection grids between said gun and layer, each of said grids including two sets of interlaced linear conductors electrically insulated from each other, the conductors of said grids defining a multiplicity of quadrilateral grid meshes having dimensions of the order of magnitude of an elemental area of the pictures to be displayed in said tube, each of said grid meshes defining, for given accelerating voltages between said gun and grids and between said grids and layer, an associated quadrilateral mesh area on said support, and an area of material fluorescent in each of the primary colors of said system disposed on said support within each of said mesh areas, the fluorescent areas in each such mesh area being disposed about the electron optical center of such mesh area with the bisectors of said fluorescent areas from said center spaced at successive angular intervals substantially equal to the angular separations of the phases of the color sub-carrier cycle of said signals at which the chrominance component of said signals is proportional to the primary color difference voltages in said signals.

6. A cathode-ray tube for the display of color television signals according to NTSC specifications, said tube comprising an electron gun, a fluorescent screen, a crossed deflection grid structure supported between said screen and gun, said structure dividing said screen into a multiplicity of quadrilateral meshes, and a plurality of phosphor areas in each of said meshes, said plurality including an area fluorescent in each of the red, blue and green primary colors of said specifications, said areas being substantially centered about the electron optical center of each such mesh at angular intervals of substantially 90° between the bisectors from said center of said red and blue areas, substantially 120° between the bisectors from said center of said blue and green areas, and substantially 150° between the bisectors from said center of said green and red areas.

7. A cathode-ray tube for the display of color television signals according to NTSC specifications, said tube comprising an electron gun, a support for a fluorescent screen, a conducting electron-permeable layer supported adjacent said support in the path of electrons from said gun, crossed color deflection grids between said gun and layer, each of said grids including two sets of interlaced linear conductors electrically insulated from each other, the conductors of said grids defining a multiplicity of quadrilateral grid meshes having dimensions of the order of magnitude of an elemental area of the pictures to be displayed in said tube, each of said grid meshes defining, for given accelerating voltages between said gun and grids and between said grids and layer, an associated quadrilateral mesh area on said support, and an area of material fluorescent in each of the red, blue and green primary colors of said specifications disposed on said support within each of said mesh areas, the fluorescent areas in each such mesh areas being disposed about the electron optical center of such mesh area at angular intervals of substantially 90° between the bisectors from said center of said red and blue areas, substantially 120° between the bisectors from said center of said blue and green areas, and substantially 150° between the bisectors from said center of said green and red areas.

8. In a receiver for the reception of color television signals of the color sub-carrier type, said receiver including a luminance amplification channel and a chrominance amplification channel, the improvement which comprises the provision of a variable gain amplifier in the chrominance channel, and means to alter the gain of said amplifier in a substantially sinusoidal manner at color subcarrier frequency, the cycle of said gain variation lagging the color burst phase of the chrominance signal as applied to said amplifier by 90°.

9. In a receiver for the display of color television signals which include a luminance component made up of weighted proportions of primary color voltages and a chrominance component including a color sub-carrier representative, at specified phases and with different constants of proportionality applicable to said phases respectively, of differences between the voltages attributable to the primary colors of the subject matter scanned and the luminance thereof, means to derive a normalized chrominance signal for which said constants of proportionality are uniform, said means comprising two multigrid tubes connected in parallel, means coupling said chrominance component to one grid of one of said tubes, and means coupling a signal whose fundamental component is of color sub-carrier frequency in opposite phases to another control grid of each of said tubes.

10. In a receiver for the display of color television signals according to NTSC specifications, means to develop from the chrominance component of said signals as received a normalized chrominance signal in which the constants of proportionality applicable to the color difference voltages in said signal are uniform, said means comprising two amplifier tubes connected in parallel, each of said tubes including a cathode, a plate and at least two control grids, means coupling said chrominance component to a first control grid of one of said tubes and means coupling a signal of color sub-carrier frequency to a second control grid of said one tube and, in opposite phase, to the corresponding control grid of the other of said tubes, said sub-carrier frequency signal having in said one tube a phase lagging by substantially 90° the phase of the burst in said chrominance component as applied to said one tube.

References Cited in the file of this patent

UNITED STATES PATENTS

| | | |
|---|---|---|
| 2,518,200 | Sziklai | Aug. 8, 1950 |
| 2,581,487 | Jenny | Jan. 8, 1952 |
| 2,669,675 | Lawrence | Feb. 16, 1954 |
| 2,734,940 | Loughlin | Feb. 14, 1956 |
| 2,745,899 | Maher | May 15, 1956 |